(12) United States Patent
Gottwald et al.

(10) Patent No.: US 9,401,764 B2
(45) Date of Patent: Jul. 26, 2016

(54) OPTICAL NETWORK UNIT

(71) Applicant: Xieon Networks S.a.r.l., Luxembourg (LU)

(72) Inventors: Erich Gottwald, Holzkirchen (DE); Ernst-Dieter Schmidt, Feldkirchen-Westerham (DE); Berthold Lankl, Egmating (DE)

(73) Assignee: Xieon Networks S.a.r.l., Luxemburg (LU)

( * ) Notice: Subject to any disclaimer, the term of this patent is extended or adjusted under 35 U.S.C. 154(b) by 89 days.

(21) Appl. No.: 14/350,736

(22) PCT Filed: Oct. 9, 2012

(86) PCT No.: PCT/EP2012/069977
§ 371 (c)(1),
(2) Date: Apr. 9, 2014

(87) PCT Pub. No.: WO2013/053717
PCT Pub. Date: Apr. 18, 2013

(65) Prior Publication Data
US 2014/0255032 A1    Sep. 11, 2014

(30) Foreign Application Priority Data
Oct. 13, 2011    (EP) .................................... 11185093

(51) Int. Cl.
*H04J 14/00* (2006.01)
*H04B 10/2575* (2013.01)
(Continued)

(52) U.S. Cl.
CPC ...... *H04B 10/25752* (2013.01); *H04B 10/2575* (2013.01); *H04B 10/2581* (2013.01); *H04J 14/0247* (2013.01); *H04J 14/0282* (2013.01); *H04J 14/0298* (2013.01)

(58) Field of Classification Search
CPC ..................... H04B 10/25752; H04B 10/2575; H04B 10/2581; H04J 14/0247; H04J 14/0282; H04J 14/0298
USPC .............................. 398/71, 72, 70, 66, 67, 68
See application file for complete search history.

(56) References Cited

U.S. PATENT DOCUMENTS 7,860,121 B2 * 12/2010 Chen ................... H04L 12/1877
370/400
(Continued)

FOREIGN PATENT DOCUMENTS

WO    2013/053717 A1    4/2013

OTHER PUBLICATIONS

Erkan, H. et al., "Native Ethernet-Based Self-Healing WDM-PON Local Access Ring Architecture: A New Direction for Supporting Simple and Efficient Resilience Capabilities," IEEE ICC 2010 Proceedings, 6 pages (2010).

(Continued)

*Primary Examiner* — M. R. Sedighian
(74) *Attorney, Agent, or Firm* — Nelson Mullins Riley & Scarborough LLP (57) ABSTRACT

The present invention provides an apparatus, in particular an optical network unit, which comprises a first part operably coupled to an arm of an optical fiber network, the first part comprises an optical module including an optical-electric interface and/or an electric-optical interface locked on a preset wavelength band, and an interface module, and at least one second part operably coupled to a network entity of a communication network, each comprising a control unit, a signal processing unit and an interface module. One of the control units of the at least one second part is set by a optical line terminal of the optical fiber network as a master control unit configured to tune and control the optical module of the first part. The first part and the at least one second part are wireless coupled with respect to each other via the interface modules.

13 Claims, 10 Drawing Sheets

(51) Int. Cl.
*H04B 10/2581* (2013.01)
*H04J 14/02* (2006.01)

(56) References Cited

U.S. PATENT DOCUMENTS

| | | | |
|---|---|---|---|
| 2009/0092394 A1* | 4/2009 | Wei | H04J 14/0282 398/79 |
| 2010/0239253 A1* | 9/2010 | Lin | H04J 14/0282 398/63 |
| 2011/0008042 A1 | 1/2011 | Stewart | |
| 2011/0135308 A1* | 6/2011 | Tarlazzi | H04B 7/0413 398/79 |
| 2011/0142447 A1 | 6/2011 | Boyd et al. | |

OTHER PUBLICATIONS

Qiao, Chunming et al., "Integrated Optical and Wireless Access/Metro Networks," IEEE, Optical Fibers Communication (OFC), Collocated National Fiber Optic Engineers Conference 2010, Conference on (OFC/NFOEC), 3 pages (2010).
International Search Report and Written Opinion for Application No. PCT/EP2012/069977, 12 pages, dated Dec. 13, 2012.

* cited by examiner

OPTICAL NETWORK UNIT

RELATED APPLICATIONS

This application is a 35 U.S.C. 371 national stage filing of International Application No. PCT/EP2012/069977,filed on Oct. 9, 2012, which claims priority to and benefit of European Patent Application No. 11185093.9, filed Oct. 13, 2011, the contents of each of which are hereby incorporated by reference herein.

FIELD OF THE INVENTION

The present invention generally relates to networks, and more specifically relates to an improved optical network unit for data transmission in optical networks for mobile applications or wireless connected subscribers.

BACKGROUND

Passive Optical Networks (PON) are networks of optical fiber lines in which optical light signals are transmitted and distributed without interposition of active amplifying components.

Figure 1:
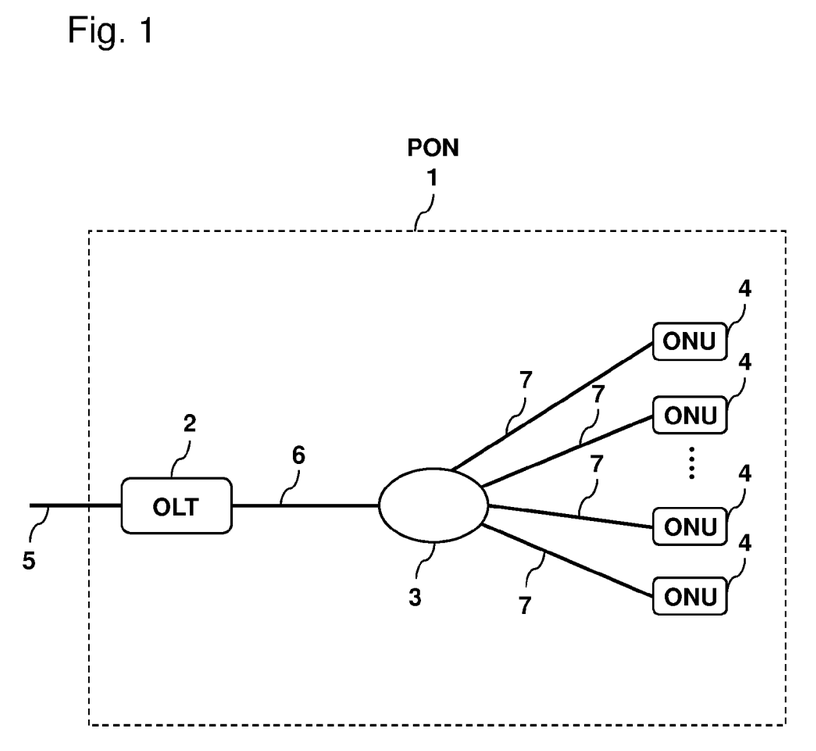
FIG. 1 is a diagrammatic representation of a conventional passive optical network.

FIG. 1 is a diagrammatic representation of a conventional passive optical network 1. The passive optical network 1 shown is a so-called metro-access network by which data from e.g. a public optical fiber network 5 are distributed to a plurality of user units 4 also called ONU (Optical Network Unit) or ONT (Optical Network Termination). The optical network comprises a so-called OLT 2 (Optical Line Terminal) as access point, which is the transmission interface between the passive optical network 1 and the overlying public optical backbone fiber network 5. Moreover, the passive optical network 1 comprises a splitting unit 3 which connects a central cable 6 coming from the OLT 2 to a plurality of arms 7, each arm 7 ending at an ONU 4.

Conventional PONs are bidirectional networks, in particular they distribute downstream traffic from the optical line terminal (OLT) to optical network units (ONUs) in a broadcast manner while the ONUs send upstream data packets.

In fiber-optic communications, wavelength-division multiplexing (WDM) is a technology which multiplexes multiple optical carrier signals on a single optical fiber by using different wavelengths (colors) of laser light to carry different signals. This allows for a multiplication in capacity, in addition to enabling bidirectional communications over one strand of fiber.

WDM systems are divided into different wavelength patterns, conventional or coarse and dense WDM. WDM systems provide, e.g., up to 16 channels in the 3rd transmission window (C-band) of silica fibers of around 1550 nm. Dense WDM uses the same transmission window but with denser channel spacing. Channel plans vary, but a typical system may use 40 channels at 100 GHz spacing or 80 channels with 50 GHz spacing. Some technologies are capable of 25 GHz spacing. Amplification options enable the extension of the usable wavelengths to the L-band, more or less doubling these numbers.

Optical access networks, e.g., coherent Ultra-Dense Wavelength Division Multiplex (UDWDM) networks, are deemed to be a promising approach for future data access. Data transmission of spectrally densely spaced wavelengths is utilized by applications as Next Generation Optical Access (NGOA) systems allowing high data transmission rates of, e.g., 10 Gbit/s and more. The total amount of data handled by one system in on fiber is in the range of one terabit.

Due to the dramatically increase of data traffic in mobile applications, new concepts and architectures, like for example adding smaller cells (Micro cells) or Cloud Ran (CRAN) are under discussion in 3GPP or NGMN.

Whatever new architecture is chosen also the infrastructure—i.e. the Mobile Backhaul (MBH)—providing the necessary capacity to the Mobile Base-Stations must be adapted.

In conventional Mobile Backhaul (MBH) solutions there are Microwave Radio links, copper based connections (e.g.: E1 connections) or DSL links and optical based point to point links as well as PONs used.

For higher bandwidth in 3GPP Long Term Evolution (LTE, 150 Mbps/eNodeB) up to 3 GBps for LTE-A (LTE Advanced) mainly fiber based solutions and Microwave Radio (MWR) solutions using high frequencies (>60 GHz) with sufficient bandwidth are the most promising choices. Fiber based solution fits best providing more than sufficient capacity also for the future, whereas the digging of the fiber needs some add on for capital expenditures (Capex). This is even more valid in very dense urban areas and especially in the last mile.

MWR based solution (>60 GHz) can provide capacity in the Gbps range, however in this case distance (~1 . . . 2 km, last mile) and "line of sight" requirement needs to be taken into account.

For the complete Mobile Backhaul (MBH) solution, therefore, a mix of fiber and MWR based infrastructure can be assumed as a very promising solution. Through the fiber infrastructure sufficient capacity for many base stations can be transported to the areas where the capacity is needed. In particular, employing MWR based solutions an easy and flexible connection for the last hundred of meters to one Base-station can be realized.

Especially for areas where a good fiber infrastructure is already available or in planning (e.g. fiber to the home FTTH coverage) a converged scenario, i.e. parallel use of the fiber based access for providing transport capacity to residential subscribers as well as for base-stations, seems to be very promising.

Figure 2:
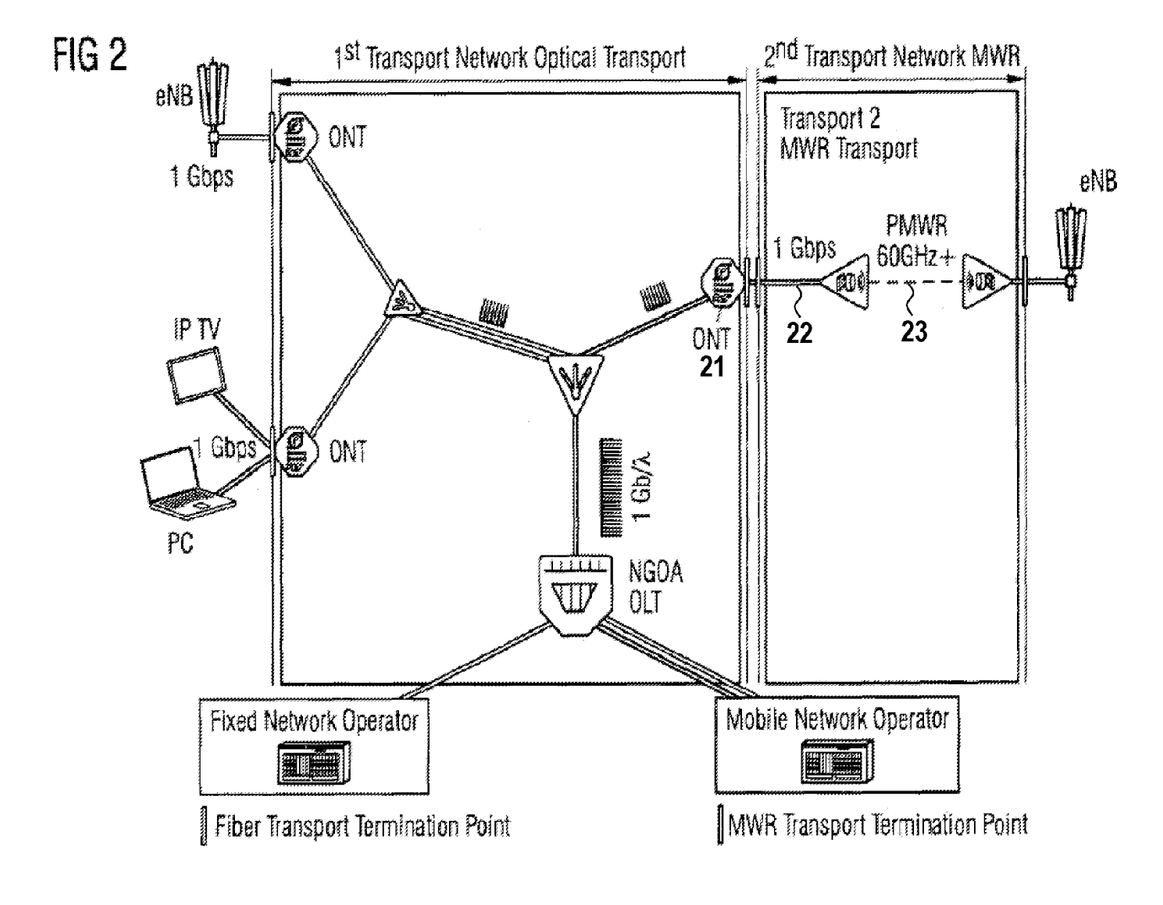
FIG. 2 is a diagrammatic representation of a conventional optical transport system.

FIG. 2 is a diagrammatic representation of a conventional UDWDM optical transport (1st Transport Network) system connected to a Microwave Radio (MWR) transport system (2nd Transport Network). At the termination of the fiber (e.g. ONU/ONT 21) via an Ethernet based interface 22 the MWR link 23 is connected. At the termination of the MWR radio link the Base-Station eNB is connected.

In this conventional scenario both the optical transport system and the Microwave Radio (MWR) transport system need their own system specific network management with different systems characteristics. For the end-to-end supervision both system status info must be combined. This can be very complex and therefore not cost effective.

Based upon the above discussions, it is concluded that there is a need in the art, for an improved system and apparatus which allows combining an optical transport system with a Microwave Radio (MWR) transport system employing one common management system.

Furthermore, there is a need for a more flexible capacity distribution. That means e.g. that the capacity transported in one wavelength to the ONT/ONU may be shared by several subscribers.

In order to achieve such more flexible capacity distribution, it may be possible to distribute the capacity of one wavelength to several ONT via a fiber infrastructure by adapted Time Division Multiplex (TDM) mechanisms.

However, since fiber infrastructure is in some cases not available or needs big investment, there is a great demand for improvement.

SUMMARY OF THE INVENTION

Therefore, it is an object underlying the present invention to provide an improved optical network unit for mobile applications. In particular, it is an object of the present invention to provide an optical network unit and transport network system, which allow combining different transport systems while employing one common management system.

According to an aspect of the present invention, there is provided an apparatus, which comprises a first part operably coupled to an arm of an optical fiber network, the first part comprises an optical module including an optical-electric interface and/or an electric-optical interface locked on a preset wavelength band, and an interface module, and at least one second part operably coupled to a network entity of a communication network, each comprising a control unit, a signal processing unit and an interface module. One of the control units of the at least one second part is set by a optical line terminal of the optical fiber network as a master control unit configured to tune and control the optical module of the first part. The first part and the at least one second part are wireless coupled with respect to each other via the interface modules.

According to another embodiment of the invention, the first part of the optical network unit is coupled with the at least one second part of the optical network unit by means of a microwave radio link.

In another embodiment, the first part of the optical network unit is coupled with the at least one second part of the optical network unit by means of at least one of a free-space optics link, coax link or Plastic Optical Fiber link.

In another embodiment, the control unit includes a digital signal processing unit.

According to certain embodiments of the invention, the first part and the second part comprising the master control unit are configured to exchange control information data with each other by means of a radio signal. Thereby, the first part and the second part comprising the master control unit may be configured to exchange control information data with each other by means of low modulation index amplitude modulation of the radio signal, wherein the modulation index is 5% of the radio signal.

According to certain embodiments of the present invention, the network entity of a communication network is a base station for a wireless network, wherein the at least one second part may be coupled with the base station for a wireless network by means of fibre link or by means of an Ethernet link.

According to certain embodiments of the present invention, the interface modules of the first part and the at least one second part include phased arrays antennas.

According to a further aspect of the present invention, a transport network system is provided, which comprises an optical communication system and a radio communication system, wherein the transport network system comprises an optical network unit, the optical network unit comprising a first part operably coupled to an arm of an optical fiber network, the first part comprises an optical module including an optical-electric interface and/or an electric-optical interface locked on a preset wavelength band, and an interface module, and at least one second part operably coupled to a network entity of a communication network, each comprising a control unit, a signal processing unit and an interface module. One of the control units of the at least one second part is set by a optical line terminal of the optical fiber network as a master control unit configured to tune and control the optical module of the first part, and the first part and the at least one second part are wireless coupled with respect to each other via the interface modules.

According to certain embodiments of the present invention, the optical communication system includes an Ultra-Dense Wavelength Division Multiplex (UDWDM) coherent network or a Dense Wavelength Division Multiplexing (DWDM) coherent network.

In further embodiments of the present invention, the optical communication system and the radio communication system may share a common management system.

Advantageous further developments or modifications of the aforementioned exemplary aspects of the present invention are set out in the dependent claims.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Exemplary aspects of the present invention will be described herein below. More specifically, exemplary aspects of the present are described hereinafter with reference to particular non-limiting examples and to what are presently considered to be conceivable embodiments of the present invention. A person skilled in the art will appreciate that the invention is by no means limited to these examples, and may be more broadly applied.

In particular, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

As regards the description of FIG. 1 and FIG. 2, reference is made to the background of the invention.

According to certain embodiments of the present invention, an optical network unit for data transmission in optical networks comprises a first part and at least one second part, the first part and the at least one second part of the optical network unit being wireless coupled with respect to each other.

Figure 3:
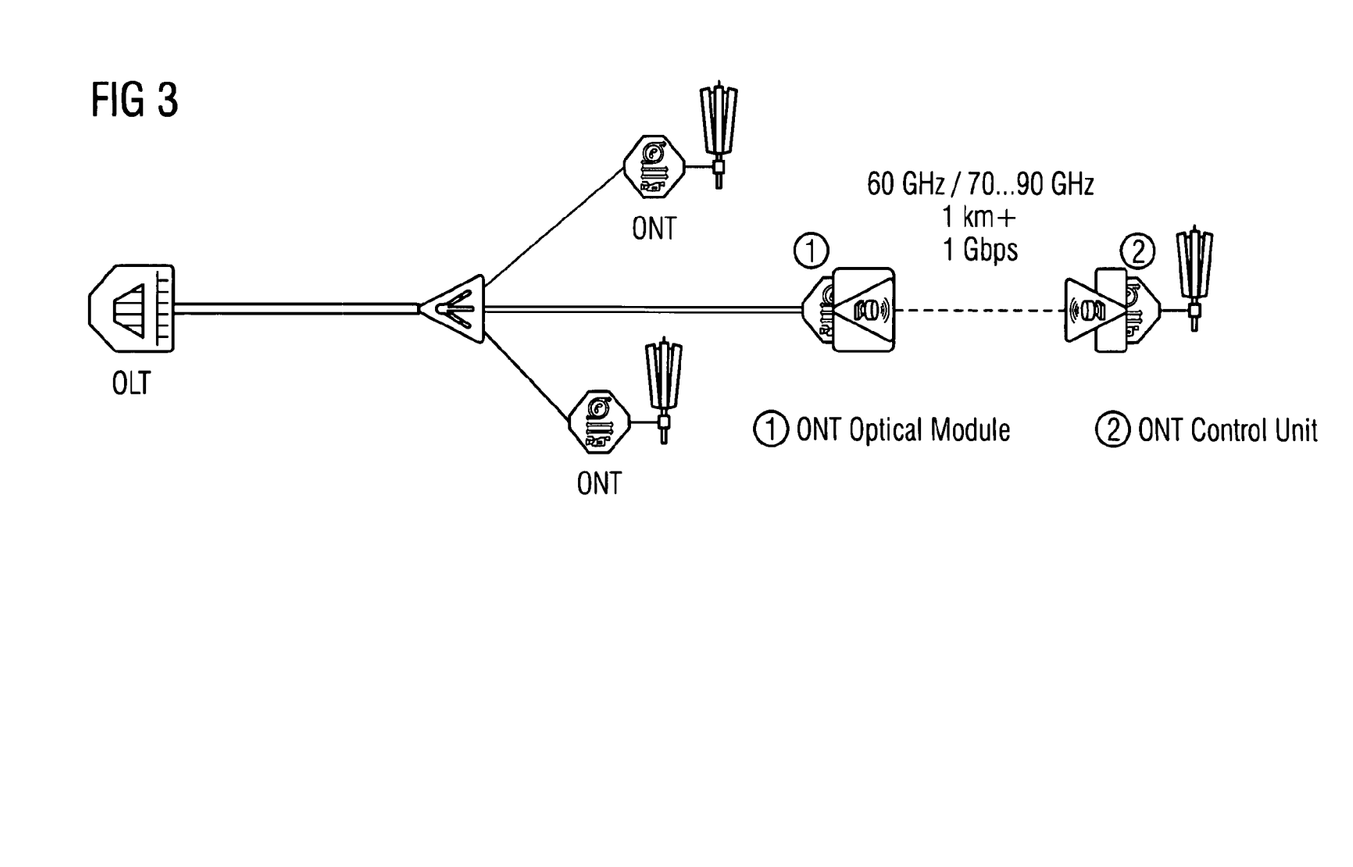
FIG. 3 schematically shows a distributed ONT-MWR link integrated in optical part.

FIG. 3 schematically shows a distributed ONT-MWR link integrated in optical part.

The first part of the optical network unit may e.g. be coupled with the at least one second part of the optical network unit by means of a microwave radio link or by means of a free-space optics link.

According to certain embodiments of the present invention, the first part of the optical network unit includes an optical module, and the at least one second part of the optical network unit includes a control unit, wherein the control unit may include a digital signal processing (DSP) unit.

Thereby, according to certain embodiments, the first part of the optical network unit and the at least one second part of the optical network unit may be configured to exchange control information data with each other by means of a radio signal, and in particular may be configured to exchange control information data with each other by means of low modulation index amplitude modulation of the radio signal, wherein the modulation index is 5% of the radio signal.

However, in order to achieve a more flexible capacity distribution in the network, according to certain embodiments of the present invention, the capacity transported in one wavelength to the ONT/ONU may be shared by several subscribers.

Figure 4:
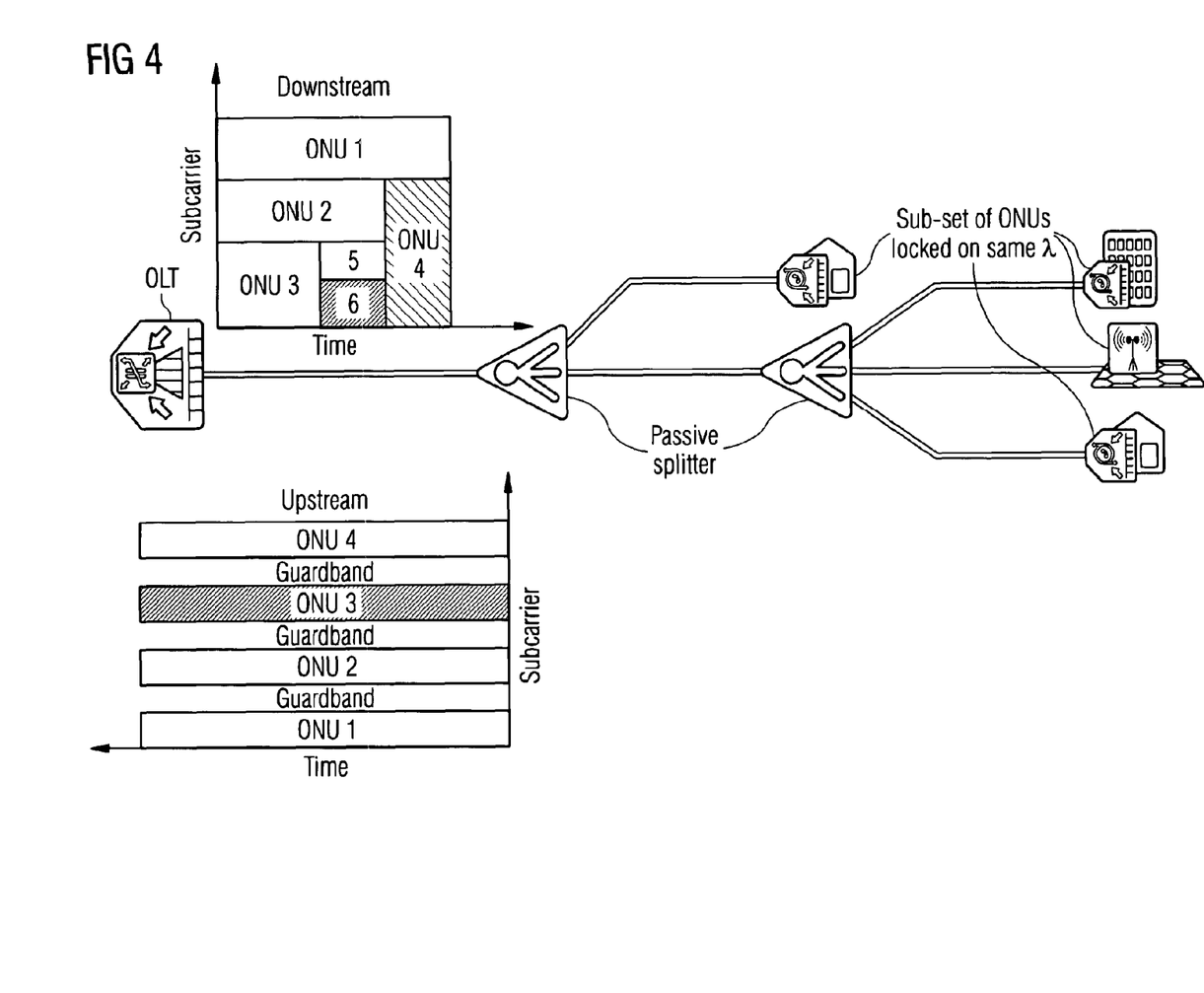
FIG. 4 schematically shows multiple ONU per wavelength band.

FIG. 4 schematically shows multiple ONU per wavelength band (Lambda). A Sub-set of ONUs is locked on the same Wavelength band (λ), so as to achieve a higher capacity transported in one wavelength band.

Figure 5:
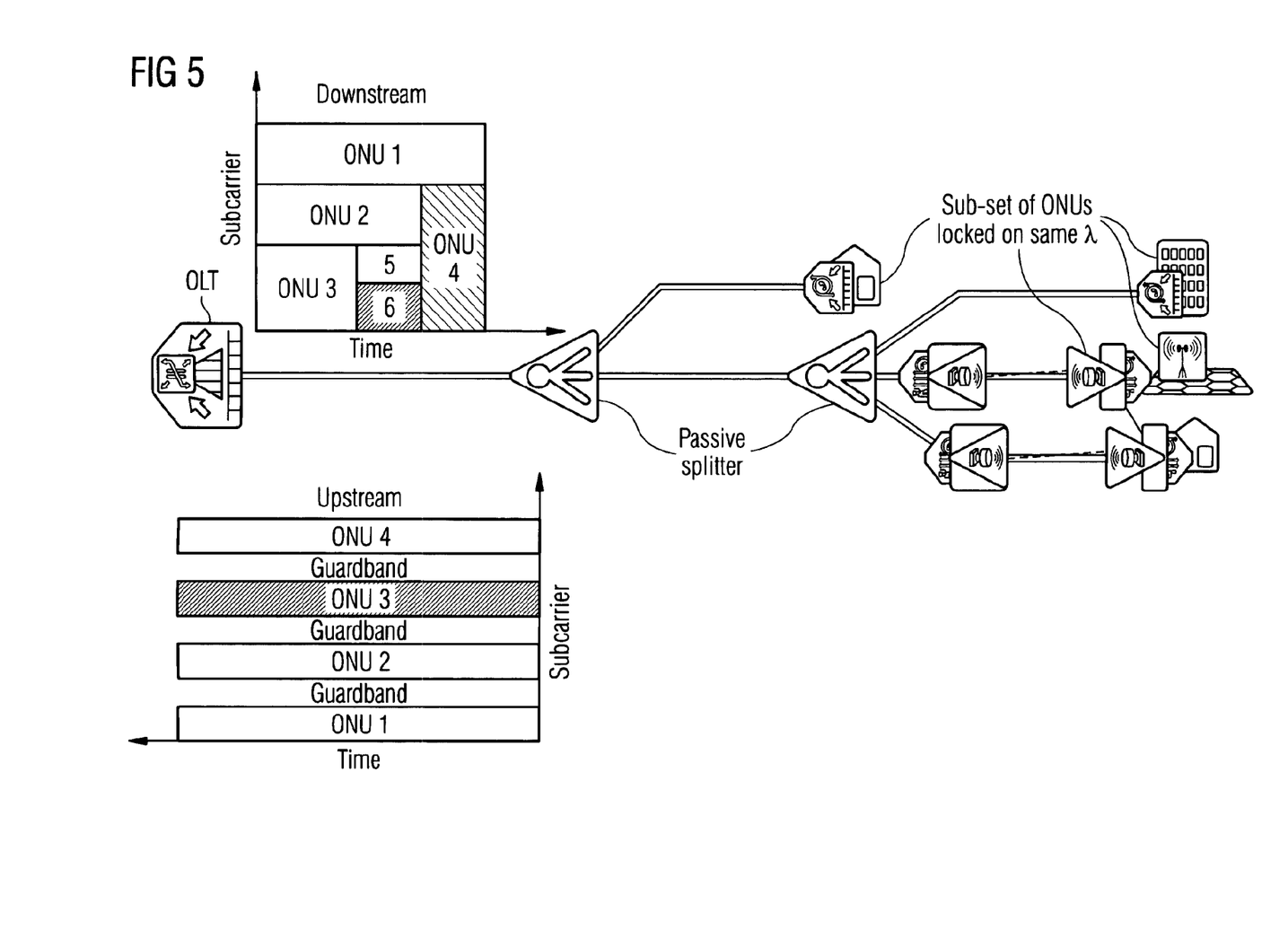
FIG. 5 schematically shows a combination of a distributed ONT-MWR link integrated in optical part with multiple ONU per Wavelength band.

FIG. 5 shows a combination of a distributed ONT-MWR link integrated in optical part with multiple ONU per Wavelength band.

However, the embodiment shown in FIG. 5 needs additional electro-optical hardware, which increases costs and maintenance.

According to further embodiments of the present invention, the realization shown in FIG. 5 may be improved in terms of saving electro-optical hardware and using more cost effective transport.

Figure 6:
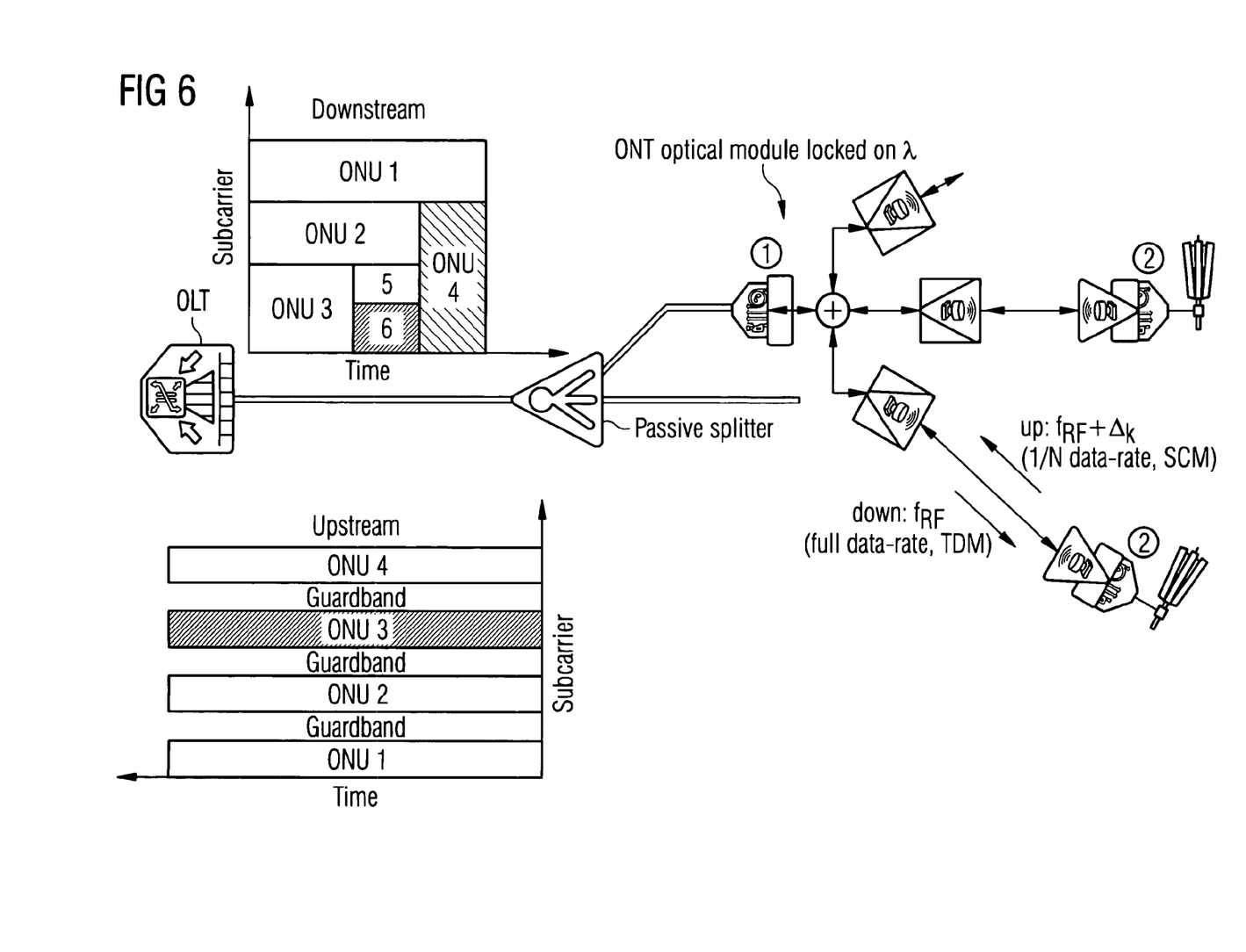
FIG. 6 schematically shows a distributed ONT plus Multiple ONU per wavelength band.

This arrangement is shown in FIG. 6. It can be realized if the subscribers are located within a range up to some few kilometers. Then, it is possible to use only one "ONT optical module" (first part) and a set of m ONT control units (second parts) at subscriber site linked by e.g. micro wave or coax cable or analogue free space optics.

One of this ONT control units may be selected by the OLT as master control unit which tunes and controls the ONT optical module.

According to further embodiments, the ONT optical module TX (transmission) part is equipped with an IQ modulator and a driving unit allowing single side band modulation, or is with simple MZM modulator.

In both cases the bias of the electro-optical (e/o) converter, which is in general based on one or more MZM (2 beam interferometers), is set to minimum transmission. With an applied driving signal with a voltage swing less than about 1.2*Vπ the modulator output shows a linear transfer function between electric driving signal and optical field.

Therefore this arrangement enables to get in the optical domain a signal spectrum similar to that in electrical domain shifted by about 195 THz in case of optical C-band operation (IQ modulator). In case of simple MZM modulator unit we have two times the same spectrum centered around TX laser wavelength.

Figure 7:
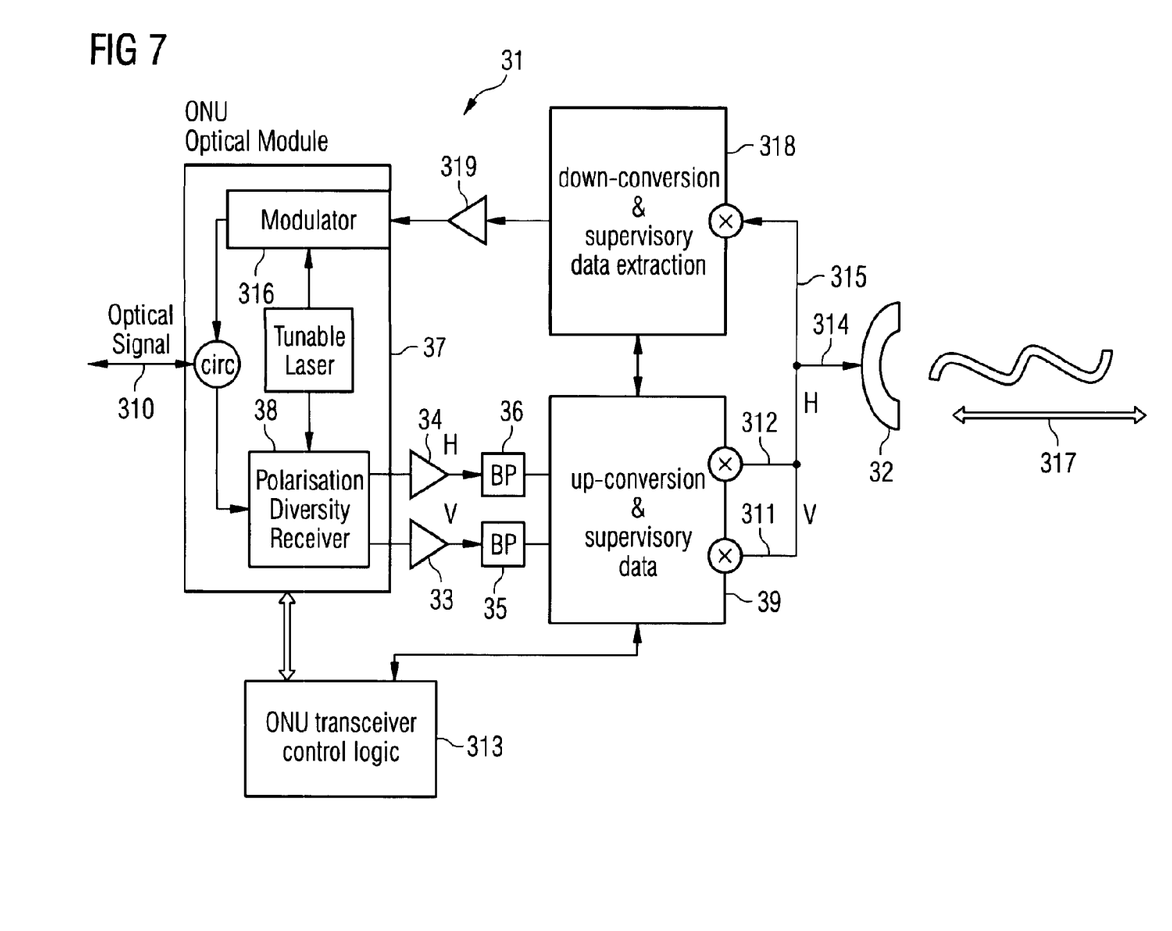
FIG. 7 is a diagrammatic representation of the first part of the ONU according to an embodiment of the invention.

FIG. 7 is a diagrammatic representation of a first part 31 of the ONU (or ONT) according to certain embodiments relating to the arrangement shown in FIG. 3, which can be considered the "analog" part of the ONU/ONT and which may include the electric-optical and optical-electric interface according to an embodiment of the invention. The received signal in electrical domain (V and H polarization) at the optical ONT head 310 is mixed on a carrier within the ONU optical module 37. The IF signals H and Y of the 2 received optical polarizations coming out of the polarization diversity receiver 38 of the ONT/ONU are amplified by the amplifiers 33 and 34, filtered by the band-pass filters 35 and 36, directly up-converted by the up-conversion module 39, send over the 2 polarization planes 311 and 312 of the radio link., and directly fed 314 to the transceiver 32 of the radio link 317. The transceiver 32 may be an antenna and the transmission 317 can be a microwave radio transmission, a plastic optical fiber (POF) transmission or alternatively a free space optics transmission. The first part 31 of the ONU (or ONT) shown in FIG. 1 may exchange control information data (e.g. supervisory data) with the second part of the ONU (or ONT) through the microwave radio interface or the free space optics interface by using low modulation index amplitude modulation of the transmitted signal or via modulated subcarriers at low frequency. The control information data may include, for example, transmission gain control or laser tuning. The ONU transceiver control logic unit 313 can be responsible for the processing of the control information data. In the opposite direction 315 the driving signal for the modulator 316 is sent via wireless link 317 as well down-converted by the down-conversion module 318 and amplified by the amplifier 319.

Figure 8:
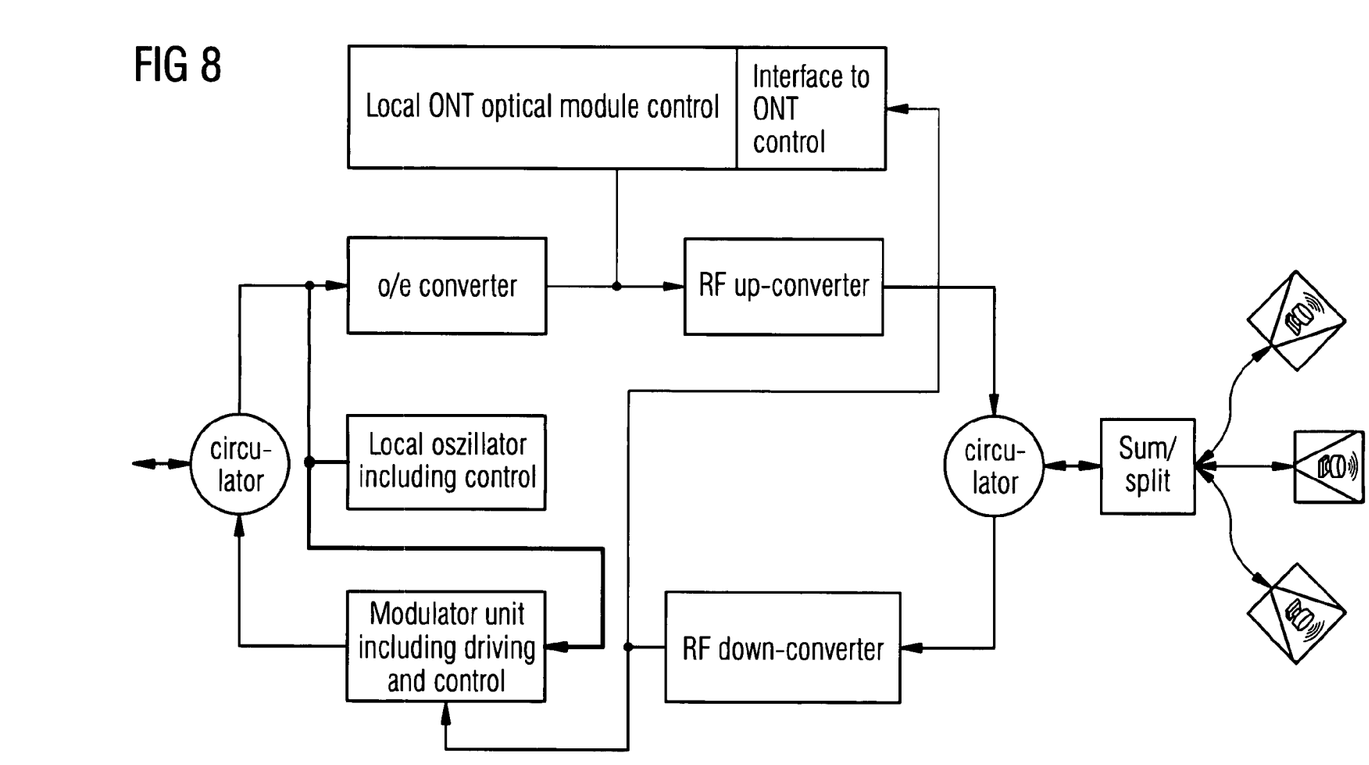
FIG. 8 is a diagrammatic representation of the first part of the ONU according to an other embodiment of the invention.

FIG. 8 is a diagrammatic representation of a first part of the ONU (or ONT) according to certain embodiments relating to the arrangement shown in FIG. 5. In particular, FIG. 8 schematically shows an optical module and the interface towards the link towards the ONT control and subscriber-site unit.

In contrast to the first part of the ONU as shown in FIG. 7, the first part of the ONU as shown in FIG. 8 comprises a further circulator connected to the RF up-converter and the RF down converter, as well as a Sum/split-unit which enables communication with one or a plurality of second parts of the ONU. It is to be noted that the circulator on the right hand in FIG. 8 is in electrical domain.

Further, a local ONT optical module control as well as an interface to an ONT control is provided.

According to the embodiments shown in FIG. 8, downstream transmission is with full data rate. Each subscriber fishes out the dedicated data. Up-stream is with fraction of it, for separation of different subscribers SCM is used. This means, that subscriber k sends the up-stream data shifted relative to RF carrier frequency $f_{RF}$ by $\Delta_k$. The RF down-converter "subtracts" $f_{RF}$ and the mixed down signal can be directly used (amplitude adjust by driving amplifier/attenuator) as driving signal for e/o modulator.

Besides using an RF modulator for mm waves also other suitable physical transport infrastructure can be used. Here "Free Space Optics", POF transmission or "coax transmission" via coax cables, even high frequency transmission over suitable copper lines can be used. This will be beneficial if adequate infrastructure is available already at the fiber termination point.

Figure 9:
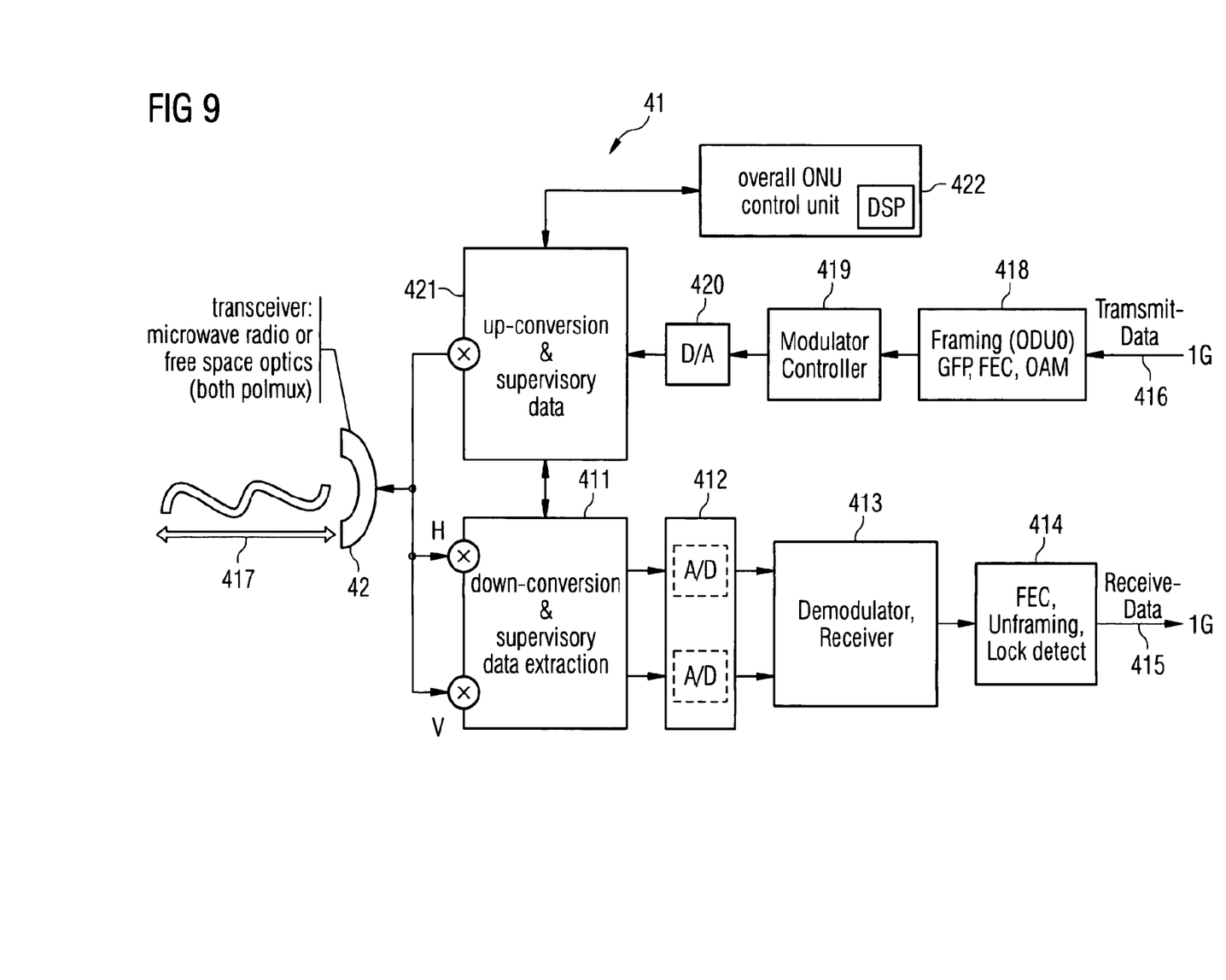
FIG. 9 is a diagrammatic representation of a second part of the ONU according to certain embodiments of the invention.

FIG. 9 is a diagrammatic representation of one of the at least one second part 41 of the ONU (or ONT) which can be considered the "digital" and "intelligent" part of the ONU/ONT, and which includes the Control Unit (DSP), according to an embodiment of the invention, which may be employed in the embodiments shown in FIGS. 3, 5 as well as in the embodiments shown in FIG. 6. In the case of FIG. 6, i.e. in case of plural second parts, as already indicated above one of these ONT control units may be selected by the OLT as master control unit which tunes and controls the ONT optical module.

Comparable to the LNB (Low Noise Block Converter) of a satellite receiver, the signal 417, transmitted from the first part of the ONU/ONT 31, is received by the transceiver 42 (e.g. an antenna), mixed, down-converted and level adjusted by the down-conversion module 411, directly fed to the ADCs 412 and then to the Demodulator 413 and to the FEC/Unframing unit 414. The received information (e.g. data) 415 can be directly sent to a base station (e.g. eNB) or, alternatively, it can be sent to a base station (e.g. eNB) via an additional fiber link (for example by means of a directly modulated laser as transmitter and photo diode plus amplifier), or alternatively it can be sent to a base station (e.g. eNB) by means of a simple 1G Ethernet link. In the opposite direction 416 the information (e.g. data) coming from the base station (e.g. eNB) can be sent to framing unit 418, then to a modulator controller 419 and to a digital-to-analog converter 420 before being up-converted by the up-conversion module 421 and sent to the transceiver 42 for the transmission 417 to the first part of the ONU 31. The transmission 417 can be a microwave radio transmission or alternatively a free space optics transmission. The overall ONU control unit 422 can be responsible for the processing of the control information data which can be exchanged between the first part 31 and the second part 41 of the ONU. The wireless link can be considered as a transparent signal line.

Hence, according to certain embodiments, the ONT delivers information about transmission quality including microwave radio or free space optic section.

This enables cost effective integrating of a Point to Multipoint (PMP) system, e.g. microwave radio based link in the transport infrastructure with low latency and single maintenance, wherein down-stream transmission is with full data rate. Each subscriber fishes out the dedicated data. Up-stream is with fraction of it, for separation of different subscribers SCM is used. This means, that subscriber k sends the up-stream data shifted relative to RF carrier frequency $f_{RF}$ by $\Delta_k$. The RF down-converter "subtracts" $f_{RF}$ and the mixed down signal can be directly used (amplitude adjust by driving amplifier/attenuator) as driving signal for e/o modulator. Besides using an RF modulator for mm waves also other suitable physical transport infrastructure can be used. Here "Free Space Optics" or "coax transmission" via coax cables, even high frequency transmission over suitable copper lines can be used. This may be beneficial if adequate infrastructure is available already at the fiber termination point.

Figure 10:
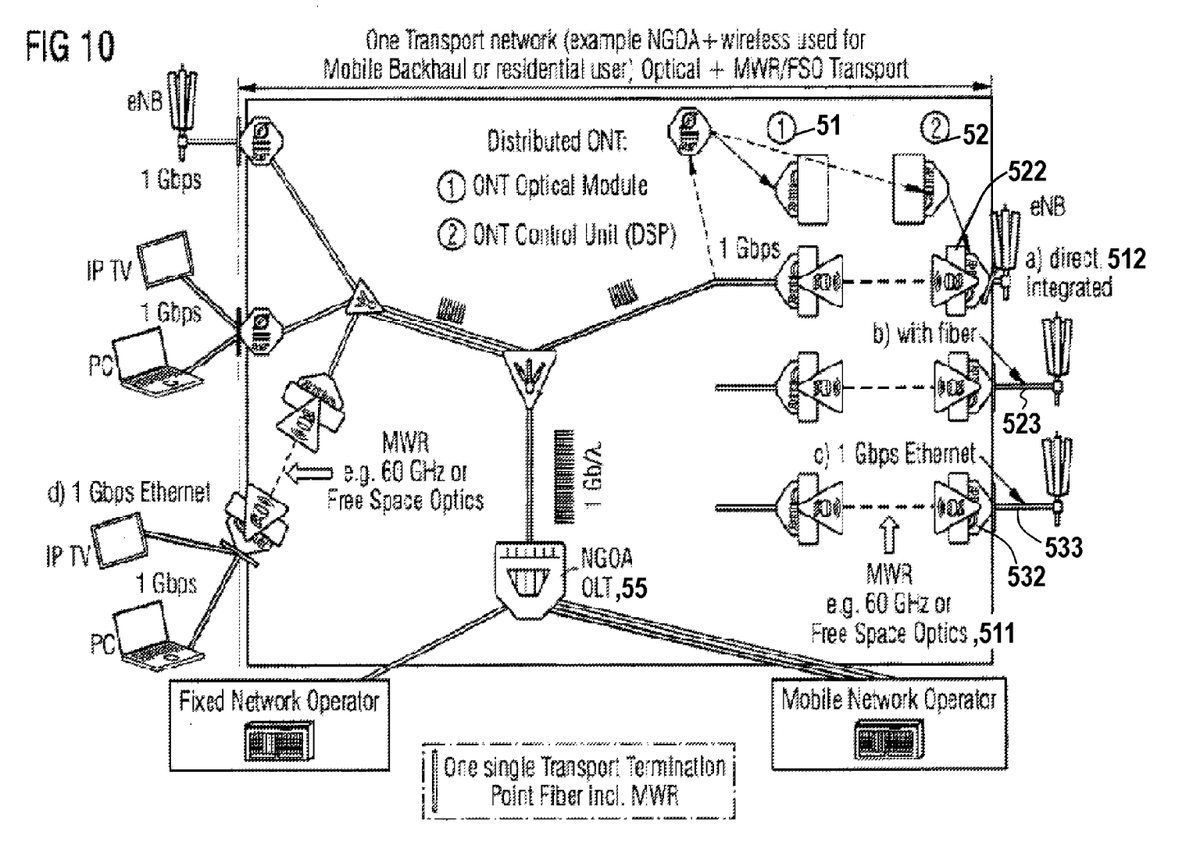
FIG. 10 is a diagrammatic representation of a transport networks according to certain embodiments of the invention.

FIG. 10 is a diagrammatic representation of a transport networks according to an embodiment of the invention which includes an optical transport network (e.g. a UDWDM "NGOA" or DWDM based coherent network) connected to a wireless transport network (used for Mobile Backhaul or residential user) sharing one common management system.

The solution presented according to an embodiment of the invention suggests a "distributed" ONU/ONT design within an UDWDM "NGOA" or DWDM based coherent network where ole and e/o conversion and digital signal processing and system management is at different locations connected by a very simple full transparent free space optics or microwave radio with only one common management system to save costs.

In particular an NGOA OLT 55, connected to an optical splitter 54, can be connected to a "distributed" ONU/OLT, including a first part 51 including the optical module and a second part 52 including the ONU/ONT control unit (DSP), the first and the second part of the ONU being wireless coupled with respect to each other by means of a microwave radio link 511 or alternatively a free space optics link 511.

In one embodiment of the invention the second part 52 (of the ONU/ONT can be directly coupled 512 with a base station (e.g. eNB). Alternatively the second part 522 of the ONU/ONT can be coupled with a base station (e.g. eNB) by means of an additional fiber link 523 (directly modulated laser as transmitter and photo diode plus amplifier). Alternatively the second part 532 of the ONU/ONT can be coupled with a base station (e.g. eNB) by means of a simple 1G Ethernet link 533. Still further, a plurality of second parts may be connected to one single ONT optical module locked on a specific wavelength λ.

In another embodiment of the invention phased array antennas and associated control units can be used. A phased array is a group of antennas in which the relative phases of the respective signals feeding the antennas are varied in such a way that the effective radiation pattern of the array is reinforced in a desired direction and suppressed in undesired directions.

In another embodiment of the invention different carrier frequencies for H and V polarization diversity RX out and H/V polarization in microwave radio link can be employed.

In an alternative embodiment of the invention only one polarization in microwave radio link but different frequencies for H and V polarization diversity RX out can be employed.

With the present invention it is possible to combine and control the wireless infrastructure with the fixed line infrastructure under one network management system until the Base station. This combination reduces the effort of handling the mobile Backhaul—which is becoming the most important part of Mobile broadband—significant, because there is only one management system still needed. Together with the extension of NGOA to DWDM ring structures it is possible to bridge a very long distance with one management system without having Optical to Electrical conversion in between. Also no deep packet inspection etc is needed for quality control and traffic routing. In total OPEX reduction and "green", i.e. less power consumption can be achieved, big advantage for commercial use of the system.

Furthermore, with the present invention the part of the infrastructure, where one fiber per subscriber is needed and must be installed or leased, is replaced with a cost effective infrastructure in 60 GHz area (non licensed) or 70-90 GHz (low license costs) with the right distance (~1 km) and the right capacity (up to 4 Gbps). Also small cells infrastructure with lower bandwidth (~100 . . . 300 Mbps) is excellent application scenarios. Also as already mentioned in case some coax infrastructure or POF infrastructure is available also this infrastructure can be used.

In the foregoing exemplary description of the apparatus, only the units that are relevant for understanding the principles of the invention have been described using functional blocks. The apparatuses may comprise further units that are necessary for its respective function. However, a description of these units is omitted in this specification. The arrangement of the functional blocks of the apparatuses is not construed to limit the invention, and the functions may be performed by one block or further split into sub-blocks.

According to exemplarily embodiments of the present invention, a system may comprise any conceivable combination of the thus depicted devices/apparatuses and other network elements, which are arranged to cooperate as described above.

Embodiments of the present invention may be implemented in software, hardware, application logic or a combination of software, hardware and application logic. If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

As may be used herein, the term "substantially" or "approximately" indicates an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise.

Also, the phrases "operably coupled", "coupled with", or "coupled to", as may be used herein, includes direct coupling and indirect coupling via another component, element, circuit, or module where, for indirect coupling, the intervening component, element, circuit, or module does not modify the information of a signal but may adjust its current level, voltage level, and/or power level. Furthermore, inferred coupling (e.g., where one element is coupled with another element by inference) includes direct and indirect coupling between two elements in the same manner as "operably coupled". Finally, the term "compares", as may be used herein, indicates that a comparison between two or more elements, items, signals, etc., provides a desired relationship.

The following meanings for the abbreviations used in this specification apply:

IQ In-phase and Quadrature
LO Local Oscillator
NGOA Next Generation Optical Access
OLT Optical Line Terminal
ONT/ONU Optical Network Termination/Optical Network Unit
PON Passive Optical Network
POF Plastic Optical Fiber
UDWDM Ultra Dense WDM
VOA Variable Optical Attenuator
RR . . . Remote Radio . . .

What is claimed is:

1. An optical network unit, comprising:
a first part operably coupled to an arm of an optical fiber network, the first part comprising an optical module including an optical-electric interface and/or an electric-optical interface locked on a preset wavelength band, and an interface module; and
at least one second part operably coupled to a network entity of a communication network, each at least one second part comprising a control unit, a signal processing unit and an interface module,
wherein one of the control unit of the at least one second part is set by an optical line terminal of the optical fiber network as a master control unit configured to tune and control the optical module of the first part; and
wherein the first part and the at least one second part are wirelessly coupled with respect to each other via the interface modules.

2. The optical network unit according to claim 1, wherein the first part of the optical network unit is coupled with the at least one second part of the optical network unit by means of a microwave radio link.

3. The optical network unit according to claim 1, wherein the first part of the optical network unit is coupled with the at least one second part of the optical network unit by means of at least one of a free-space optics link, coax link or Plastic Optical Fiber link.

4. The optical network unit according to claim 1, wherein the control unit includes a digital signal processing unit.

5. The optical network unit according to claim 1, wherein the first part and the second part comprising the master control unit are configured to exchange control information data with each other by means of a radio signal.

6. The optical network unit according to claim 5, wherein the first part and the second part comprising the master control unit are configured to exchange control information data with each other by means of low modulation index amplitude modulation of the radio signal, wherein the modulation index is 5% of the radio signal.

7. The optical network unit according to claim 1, wherein the network entity of the communication network is a base station for a wireless network.

8. The optical network unit according to claim 7, wherein the at least one second part is coupled with the base station for the wireless network by means of fibre link or by means of an Ethernet link.

9. The optical network unit according to claim 1, wherein the interface modules of the first part and the at least one second part include phased arrays antennas.

10. A transport network system, comprising:
an optical communication system; and
a radio communication system,
wherein the transport network system comprises an optical network unit, the optical network unit comprising a first part operably coupled to an arm of an optical fiber network, the first part comprising an optical module including an optical-electric interface and/or an electric-optical interface locked on a preset wavelength band, and an interface module, and at least one second part operably coupled to a network entity of a communication network, each at least one second part comprising a control unit, a signal processing unit and an interface module,
wherein the control unit of one of the at least one second part is set by an optical line terminal of the optical fiber network as a master control unit configured to tune and control the optical module of the first part; and
wherein the first part and the at least one second part are wireless coupled with respect to each other via the interface modules.

11. A transport network system according to claim 10, wherein the optical communication system includes an Ultra-Dense Wavelength Division Multiplex (UDWDM) coherent network.

12. A transport network system according to claim 10, wherein the optical communication system includes a Dense Wavelength Division Multiplexing (DWDM) coherent network.

13. A transport networks system according to claim 10, wherein the optical communication system and the radio communication system share a common management system.

* * * * *